United States Patent Office 2,985,157
Patented May 23, 1961

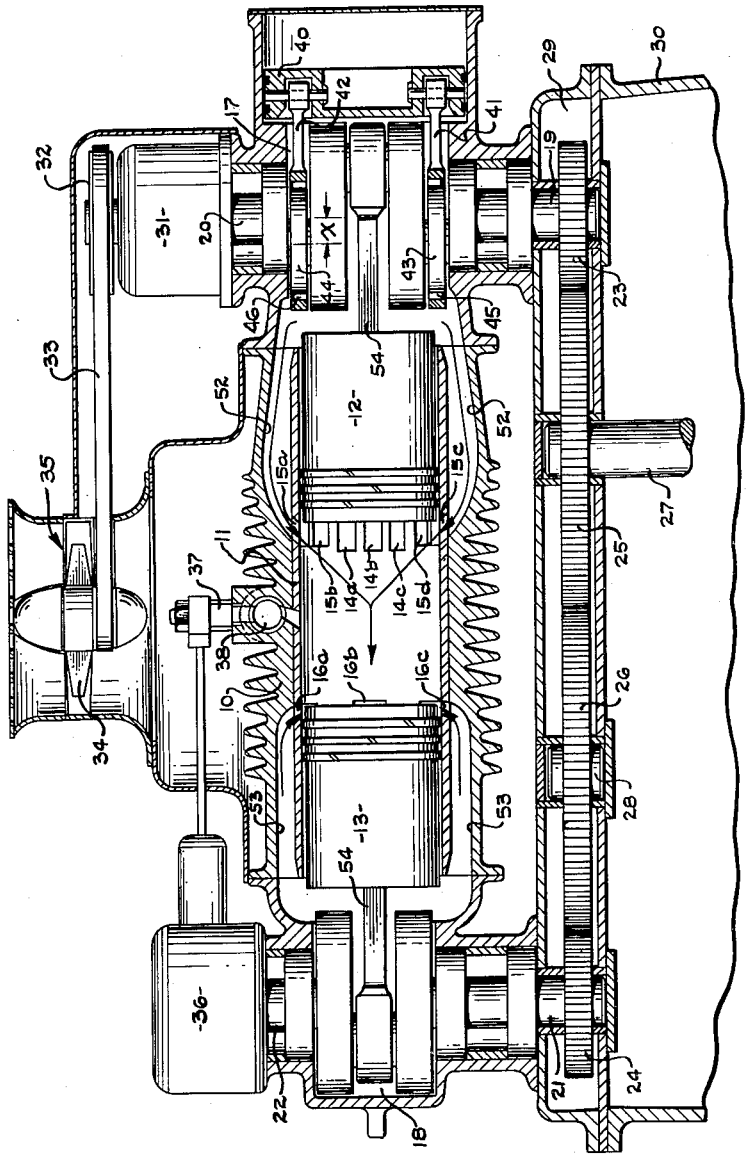

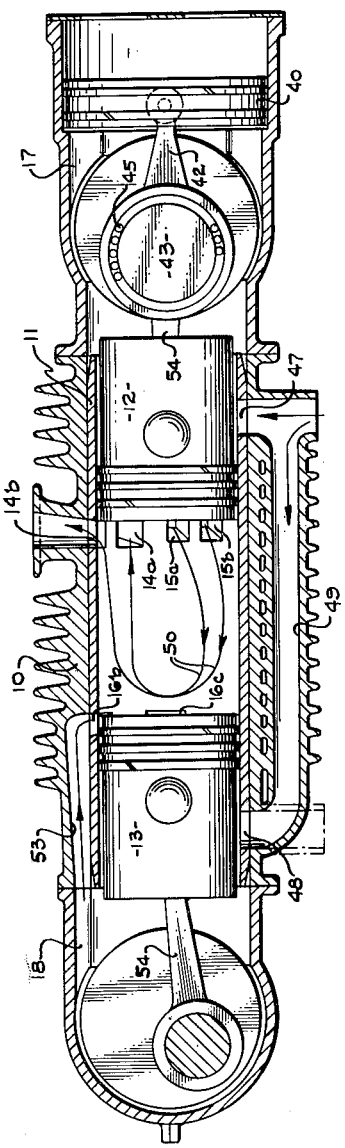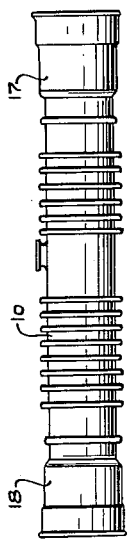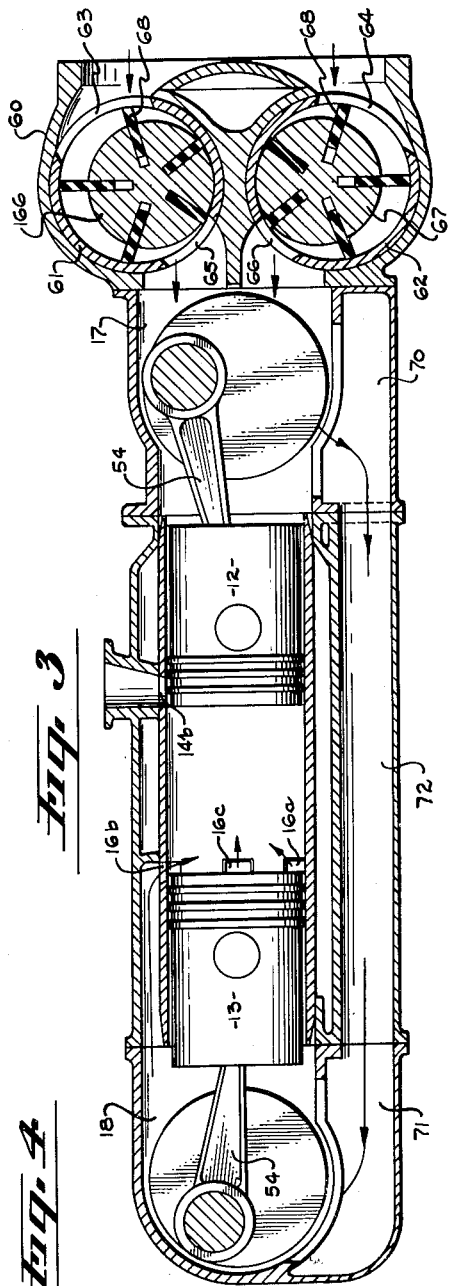

2,985,157
SUPERCHARGED, PORT CONTROLLED OPPOSED PISTON, TWO-CYCLE INTERNAL COMBUSTION ENGINE

Herbert J. Venediger, Furth, Bavaria, Germany, assignor of one-half to Thomas B. Danckwortt, Beaumont, Calif.

Filed Aug. 3, 1959, Ser. No. 831,319

Claims priority, application Germany Aug. 16, 1958

9 Claims. (Cl. 123—51)

The invention relates to improvements in a port controlled opposed piston, two-cycle, internal combustion engine with two working pistons moving towards each other during the compression stroke in one common working cylinder, forming the combustion space or a part thereof between each other. One cylinder end has exhaust and scavenging ports controlled by the first working piston and arranged in approximately the same height, so that the cylinder space opened between the two working pistons during a working cycle will be air scavenged and air charged, whereas the second working piston controls at its cylinder end the air charging ducts only.

A two-cycle internal combustion engine of this type is disclosed in United States Letters Patent 2,768,616. The present invention constitutes a considerable improvement of such a known engine in regard to improving the scavenging and charging of the combustion space in order to materially increase the obtainable horsepower output per unit of piston displacement by supercharging in a simple manner.

The new improvement brings about an essential increase of scavenging and charging air delivery, as controlled by the first working piston on one side of the combustion space, and by the second working piston on the other side of the combustion space. This is accomplished in one form of the invention by the provision of an auxiliary charging piston or pistons of large diameter and relatively short stroke, collaborating with the first working piston (or exhaust piston), or with the second piston controlling the air charging ports, or with both working pistons, in a unique and advantageous arrangement.

The additional or supercharging piston sucks sufficient fresh air into the crankcase constructed as an air receiver that the volume of air available for scavenging of the combustion space is larger than the cylinder combustion space opened by both working pistons during the scavenging process. Furthermore, the crankcase air volume of the second working piston controlling the charging ports can be made large enough in accordance with the invention that the desired fresh air volume available for the end of the loading or charging process is larger than previously thought possible. The largest available scavenging air volume controlled by the exhaust piston on one side, and the largest available charging air volume controlled by the charging piston on the other side, are assured according to this invention through the provision in the crankcase of the exhaust piston, as well as that of the charging piston of separate, auxiliary charging pistons operating in the opposite directions with respect to the collaborating working pistons, whereby both crankcase volumes are independent of each other.

Instead of the foregoing, according to the invention only one of the two crankcases can be equipped with an auxiliary charging piston, while the other crankcase pumps for itself free air, or the latter can be connected to the other crankcase equipped with the auxiliary charging piston. Another feature is that one of the two working pistons, preferably the charging piston, may have a smaller diameter than the other piston, the crankcase of which is equipped with the auxiliary charging piston.

The highest possible power output of this engine and the greatest volume of scavenging and charging air can be provided by mounting a mechanical air compressor or blower on the front side of the crankcase, preferably the exhaust piston side. This blower discharges scavenging and charging air in the direction of the cylinder axis into the crankcase of the exhaust piston communicating with an air receiver. According to the invention, both crankcase chambers can be connected with each other by an air receiver of great volume extending alongside the cylinder axis. In this case, the air receiver connecting both crankcases can be built in pipe form completely enclosing the working cylinder. This arrangement of the air receiver gives the important advantage of creating a relatively very great total air receiving volume which substantially reduces the scavenging and charging air pressure fluctuations during the working cycle, an advantage of decisive importance for an exact scavenging and charging. The invention creates another advantage by discharging the blower air against the bottom side of the piston, preferably the exhaust piston, thereby cooling it intensively. Therefore, oil cooling of pistons customary and necessary for supercharged two-cycle engines is unnecessary.

The scavenging and charging air supply can also be increased furthermore by connecting the discharge of an exhaust driven turbo-charger to the suction side of the mechanical charge compressor, the turbo-charger therefore representing the first stage of air compression (BBC-Curtiss arrangement, respectively a series of bypass operations). Instead of this, an arrangement can be made such that the mechanical charger and the exhaust driven turbo-charger deliver scavenging and charging air independently of each other and by separate and parallel ducts into the crankcase or crankcases, preferably that of the exhaust piston.

These and other objects of the invention, as well as the details of an illustrative embodiment, will be more fully understood from the following detailed description of the drawings, in which:

Fig. 1 and Fig. 2 are axial sections taken at right angles and showing an arrangement with a single charging piston operating in opposition to an exhaust piston;

Fig. 3 is an axial section showing the two-cycle opposed piston engine according to the invention with a duplex vane type rotary blower of the multiple cell type discharging into the crankcase of the exhaust piston; and Fig. 4 shows a modified supercharged engine arrangement.

In Figs. 1 and 2, 10 is the cylinder body, 11 the cylinder, 12 the first working piston or exhaust piston controlling the exhaust and scavenging ports, and 13 the second working piston or charging piston controlling the charging ports. The exhaust ports are numbered 14a through 14c, and the scavenging ports 15a through 15d. The scavenging port pair 15a and 15b are approximately opposite the pair 15c and 15d, these scavenging port pairs being separated from each other by the exhaust ports 14a through 14c. The scavenging ports are directed against the cylinder wall opposite the exhaust ports, this arrangement resulting in reverse loop scavenging, following the cylinder outline. Instead of this arrangement, another cylinder outline scavenging system can be used.

The charging ports controlled by the charging piston are numbered 16a through 16c, and are distributed around the cylinder circumference in the customary manner and enter the cylinder preferentially tangentially to the bore. To safeguard the charging effect, the piston 13 follows the piston 12 by an angle φ, whereby the ports 16 open later and close later than the ports 14 and 15 which the piston 12 controls.

The crank chamber of piston 12 is numbered 17, while 18 is the crankcase belonging to piston 13. The opposite shaft ends of both crankshafts are numbered 19 and 20, and 21 and 22 respectively. The shaft ends 19 and 21 carry gears 23 and 24, meshing with other gears 25 and 26 mounted on shafts 27 and 28, parallel to the crankshafts. The power output from the crankshafts is transmitted by the gears in this example to the power delivering shaft 27. This train of gears is housed in an oil filled gear case 29, which also can serve as the base or foundation for the whole two-cycle, internal combustion engine. The driven machinery, for instance an electric generator, etc. . . . is mounted within the housing 30.

The second crankshaft end 20 of the exhaust piston 12 drives other accessories 31 and carries also the pulley 32, driving belt 33 which in turn drives the rotor 34 of the axial cooling blower 35. The axis of this blower is located normal to the center of the working cylinder 11 and guides the cooling air directly to the hottest places, especially the exhaust outlet.

The second crankshaft end 22 of charging piston 13 drives the fuel injection pump, governor and lubrication pump 36. The injection nozzle is shown at 37 for injecting fuel into the turbulence chamber 38. This chamber can also take the form of a precombustion chamber, a disc shape direct injection configuration, or any other suitable shape.

The form of the invention shown in Figs. 1 and 2 shows the connection of an auxiliary charging piston 40 to the driving mechanism of the exhaust piston 12 by means of two connecting rods 41 and 42. Eccentric discs 43 and 44 (or checks) are solidly connected with the crankshaft while the connecting rods 41 and 42 glide upon the eccentrics by means of cage roller or needle bearings 45 and 46. The center of each eccentric disc is displaced from the axis of the crankshaft ends 19 and 20 by an amount "x" such that the pistons 12 and 40 simultaneously arrive at their respective inner dead centers, as shown in Figs. 1 and 2. In this position the scavenging and charging air collected between the pistons 12 and 40 in the crankcase 17 is blown through the scavenging ducts 15 into the then open cylinder space. A little later the crankcase chamber 18 discharges its charging air into the working cylinder via the charging ports 16.

After the scavenging and charging as controlled by piston 12, this piston moves from inner dead center to outer dead center (and corresponding to the angular φ, displacement of piston 13) the lower edge of piston 12 uncovers the port opening 47 which connects the crankcase chamber 17 with the outside air, while the lower edge of piston 13 uncovers the port opening 48. The latter can either be connected with port 47 by air duct 49, or separated to communicate independently with the open air.

When pistons 12 and 40 are moving toward their outer dead centers a very substantial vacuum results in crankcase 17, such vacuum becoming larger the greater the diameter and the stroke of the auxiliary charging piston 40. For practical purposes, the diameter of one auxiliary charging piston 40 should be twice as large as the diameter of the working piston 12, while its stroke 2x should be smaller than the stroke of piston 12.

In the example shown, the stroke 2x is half as large as the stroke of piston 12. The considerable vacuum created operates to fill the crankcase space 17 completely with fresh air, so that the volume of the space 17 becomes several times the displacement of piston 12, providing a large amount of air for the scavenging and charging processes. When port opening 48 is connected through air manifold 49 with the opening 47, the greater vacuum created in crankcase space 17 also extends to crankcase space 18, filling this space with more fresh air. However, when piston 13 reaches its outer dead center later than the piston 12 due to crank angle displacement, it should be decided from case to case whether the amount of air taken into 18 may be increased with a separate fresh air opening 48. To safeguard the motion of the scavenging streams around the cylinder, as shown at 50 in Fig. 2, and to accomplish a high air delivery ratio of the crankcase pumps, the stroke of working pistons 12 and 13 is chosen smaller than the cylinder diameter. It is advantageous, for example, to have a ratio of stroke to cylinder bore of 0.7 to 1.0. In Figs. 1 and 2, ducts 52 and 53 are shown connecting the chambers 17 and 18 respectively with the scavenging and charging ports 15 and 16. The working piston connecting rods are shown at 54.

In operation, when pistons 12 and 13 are driven apart by expanding combustion gases the air intake ports 47 and 48 are first closed by the piston skirts and the charges in both crankcases 17 and 18 are compressed. Thereafter, exhaust ports 14 and scavenging ports 15 are uncovered in that sequence by piston 12, the charge in crankcase 17 being rammed through the scavenging ports into the combustion space by the compressing action of both pistons 12 and 40. At the same time, piston 12 is cooled by the charge pumping action of piston 40. Finally, ports 16 are uncovered by piston 13, and the charge compressed in crankcase 18 is released into the combustion space. Thereafter, the pistons 12 and 13 move toward one another, covering ports 16, 15 and 14 in that sequence and compressing the charge. At the appropriate time the compressed charge undergoes combustion.

When intake ports 47 and 48 are uncovered, the gaseous charge is drawn into the crankcases 17 and 18 in greater volume than in the absence of piston 40, since the latter is moving away from port 47 and piston 12 and sucks more air into crankcase 17 and with increased impulse. Also, more air moves into crankcase 18 in view of the increased impulse given to the air flow entering duct 49.

Fig. 4 shows an engine in which supercharging pistons are located at both ends of the engine in the manner described.

Fig. 3 shows a cylinder length section corresponding to Fig. 2 of the opposed piston, two-cycle internal combustion engine according to the invention, wherein the scavenging and charging air is delivered by a mechanical air supercharger. In this example of a water jacketed and water-cooled, two-cycle opposed piston engine, the light metal housing 60 of the mechanical blower is flange connected to the open front of the crankcase housing containing the crankcase space 17. Housing 60 contains two parallel sleeve liners 61 and 62 typically made out of cast iron or steel, having inlet ports 63 and 64, and exhaust ports 65 and 66. Two rotors or drums 166 and 67 having parallel axes turn in counter rotary relation to each other and eccentrically in relation to the center or axis of each sleeve liner. Each drum contains plate-formed vanes or slides 68 as shown, which during rotor operation bear against the liners and displace air from inlets 63 and 64 to outlets 65 and 66. The two drums 166 and 67 are connected with each other by two gears not shown, one of these gears being driven by a belt running off a pulley mounted on the same shaft as the crankshaft 20 shown in Fig. 1. The above described construction of the air charger is of no special importance for this invention, as any other blower or supercharger can be used. Of importance, however, is the manner in which the blower is arranged in relation to the engine. In the construction shown in Fig. 3, the charger discharges fresh air in the direction of the cylinder axis into crankcase 17 and supports first of all the scavenging impulse since the scavenging ports 15 have the same direction parallel to the cylinder axis. Secondly, the fresh air from the blower blows steadily against the bottom side of the thermally highly stressed exhaust piston 12, cooling the piston intensively.

The crankcase 17 opens laterally into an air receiver manifold 70, and the crankcase 18 opens laterally into an air receiver 71, these receivers being connected with each other through the main air receiving manifold 72. The latter can be wrapped around the cylinder and water jacket to get the largest possible total air receiver volume equal to the sum of the volumes of receivers 70, 71 and 72. In this case the total receiver air volume can be brought up to 15 times the size of the working cylinder displacement volume, reducing the scavenging and charging air pressure fluctuations to practically zero and accomplishing perfect scavenging conditions.

Fig. 3 shows the position of the working pistons wherein the exhaust ports are already covered by piston 12 while the charging ports 16a through 16c are still partly open, resulting in good supercharging.

An exhaust driven supercharger can be connected in the known manner to the cylinder exhaust, discharging its fresh air delivery to the suction side of the mechanical air charger, as the working piston supports the suction effect on its inward stroke. This is similar to a BBC (Brown, Boveri Cie.) arrangement, a series bypass combination of exhaust turbo-charger and mechanical blower. Instead of this, the exhaust turbo-charger, as well as the mechanical charger can be arranged to deliver air directly into the crankcase 17 or 18 or into both crankcases simultaneously. In this case the mechanical blower and exhaust turbo-charger work together and in parallel upon the air receivers 70, 71 and 72.

In the drawings both working pistons 12 and 13 are shown to have the same piston stroke. Instead of this, both piston drive mechanisms could have different strokes, or the pistons could have different diameters. When the charging piston 13 is to discharge a smaller volume of air into and through the air charging ducts 16 than the working piston 12 is to deliver for cylinder scavenging, it is advantageous sometimes to choose the diameter or the stroke, or both dimensions of piston 13 smaller than those of the working piston 12. To maintain perfect mass balance inherently desirable for an opposed piston engine incorporating a single auxiliary charging piston 40 as shown in Fig. 1 and Fig. 2, the driving mechanism of piston 13 will be increased in weight so as to balance the inertia load increase of the piston 12 by the charging piston 40 as much as possible, and also to balance the resultant forces due to the crank displacement angle.

I claim:

1. In an opposed piston, two-cycle internal combustion engine including cylinder means receiving the opposed working pistons and forming therewith a combustion space between the pistons, the cylinder means having an axis along with which said working pistons are in longitudinal alignment, rotary crankshafts coupled to the working pistons, crankcase chamber means receiving the crankshafts, intake ports for passing fresh air into said crankcase chamber means to be compressed by said pistons, the cylinder means also having at one end inlet ports for passing compressed scavenging air into said combustion space and at the other end inlet ports for passing compressed charging air into said combustion space and having exhaust ports for passing combustion gases from said space, the working pistons being movable in opposition in the cylinder means to control opening and closing of said ports for two-cycle engine operation, the inlet ports controlled by the one working piston which opens and closes the exhaust ports being adapted to direct the scavenging air in a loop shaped path, the improvement that comprises auxiliary pump means communicating with certain of said inlet ports through said crankcase chamber means, said auxiliary pump means being driven in relation to reciprocation of said working pistons to displace fresh air in said crankcase chamber means increasing air delivery through said certain ports into said combustion space, said auxiliary pump means being in longitudinal alignment with the working pistons, said auxiliary pump means being openly exposed to the one working piston controlling the exhaust ports through a crankcase chamber receiving the crankshaft coupled to said one working piston for displacing scavenging air in the direction of the cylinder axis and toward said one working piston, said one working piston controlling the inlet ports for passing scavenging air which accomplishes loop scavenging of the opposed piston two-cycle engine, said working pistons having closed and plain heads, said inlet ports and exhaust ports being spaced in such relation to working piston movement that said one working piston opens said certain inlet ports before the other working piston opens the inlet ports controlled thereby and said one working piston closes said certain inlet ports before the other working piston closes the inlet ports controlled thereby.

2. In an opposed piston, two-cycle internal combustion engine including cylinder means receiving the opposed working pistons and forming therewith a combustion space between the pistons, the cylinder means having an axis along with which said working pistons are in longitudinal alignment, rotary crankshafts coupled to the working pistons, crankcase chamber means receiving the crankshafts, the cylinder means having intake ports for passing fresh air into said crankcase chamber means to be compressed by said pistons, the cylinder means also having at one end inlet ports for passing compressed scavenging air into said combustion space and at the other end inlet ports for passing compressed charging air into said combustion space and having exhaust ports for passing combustion gases from said space, the working pistons being movable in opposition in the cylinder means to control opening and closing of said ports for two-cycle engine operation, the inlet ports controlled by the one working piston which opens and closes the exhaust ports being adapted to direct the scavenging air in a loop shaped path, the improvement that comprises auxiliary pump means in communication with certain of said inlet ports through said crankcase chamber means, said auxiliary pump means being driven in relation to reciprocation of said working piston to displace fresh air in said crankcase chamber means increasing air delivery through said certain ports into said combustion space, said auxiliary pump means being in longitudinal alignment with and opposite the one working piston controlling the exhaust ports and the scavenging air inlet ports, said pump means being openly exposed to the one working piston controlling the exhaust ports through a crankcase chamber receiving the crankshaft coupled to said one working piston for displacing scavenging air in the direction of the cylinder axis and toward said one working piston, said working pistons having closed and plain heads and said pump means remaining in communication with said certain air inlet ports through said one crankcase, said certain air inlet ports being adapted when opened by said one working piston to direct the scavenging air into said combustion space to flow in a loop shaped path extending toward the other working piston and back toward the exhaust ports, and the air inlet ports controlled by the other working piston being adapted when opened to direct charging air into said combustion space to flow toward said one working piston, said auxiliary pump means comprising an auxiliary piston coupled to one crankshaft to reciprocate in a cylindrical portion of said crankcase chamber means in opposition to said one working piston coupled to said one crankshaft, said auxiliary piston having a larger diameter and shorter stroke than the diameter and stroke of said working piston, said auxiliary piston being in axial and longitudinal alignment with said one working piston and having a closed and plain head, said inlet ports and exhaust ports being spaced in such relation to working piston movement that said one working piston opens said certain inlet ports before the other working piston opens the inlet ports controlled thereby and said one working piston closes said certain inlet ports before the other working piston closes the inlet ports controlled thereby.

3. The invention as defined in claim 2 in which said cylinder means includes an engine body having passages maintaining open communication between said auxiliary piston and all scavenging air inlet ports controlled by said one working piston throughout the reciprocation thereof.

4. The invention as defined in claim 3 including another auxiliary piston coupled to the crankshaft which is coupled to the other working piston and communicating with the charging air inlet ports to said combustion space.

5. The invention as defined in claim 2 including a working connecting rod coupling said one working piston to said one crankshaft, and two separate auxiliary connecting rods at opposite sides of said working connecting rod and each independently coupling said auxiliary piston to said one crankshaft in such relation that the working and auxiliary pistons travel oppositely toward inner dead center positions.

6. The invention as defined in claim 5 in which said auxiliary piston has a diameter substantially larger than the diameter of said working piston, and said auxiliary piston has a stroke substantially smaller than the stroke of said working piston.

7. The invention as defined in claim 1 including an enlarged air receiver extending alongside the cylinder means and communicating with the crankcase chamber means receiving the crankshafts.

8. The invention as defined in claim 7 in which said auxiliary pump means comprises a rotary blower including a pair of rotors rotatable about spaced parallel axes, radially movable vanes carried by the rotors, and substantially cylindrical rotor casings extending eccentrically about the rotor axes so that the vanes are adapted to move relatively toward and away from the rotor axes while remaining in centrifugal engagement with the casing inner surfaces, said casings having air inlet openings and compressed air outlet openings facing said one crankshaft.

9. The invention as defined in claim 2 in which the cylinder means includes an engine body containing a passage communicating between the intake ports.

References Cited in the file of this patent

UNITED STATES PATENTS

| | | |
|---|---|---|
| 864,818 | Wolcott | Sept. 3, 1907 |
| 871,539 | Van Auken | Nov. 19, 1907 |
| 968,702 | Sears | Aug. 30, 1910 |
| 1,350,135 | Berg | Aug. 17, 1920 |
| 1,586,118 | Rosborg | May 25, 1926 |
| 2,139,457 | Patchett | Dec. 6, 1938 |
| 2,406,404 | Ryde | Aug. 27, 1946 |
| 2,431,859 | Fisher | Dec. 2, 1947 |
| 2,477,374 | Ide | July 26, 1949 |
| 2,768,616 | Venediger | Oct. 30, 1956 |

FOREIGN PATENTS

| | | |
|---|---|---|
| 23,133 | Great Britain | Oct. 3, 1912 |
| 81,671 | Switzerland | Nov. 17, 1919 |